J. PRINCE & N. D. MARTIN.
Apparatus for Cooling Milk and Cream.
No. 136,542. Patented March 4, 1873.
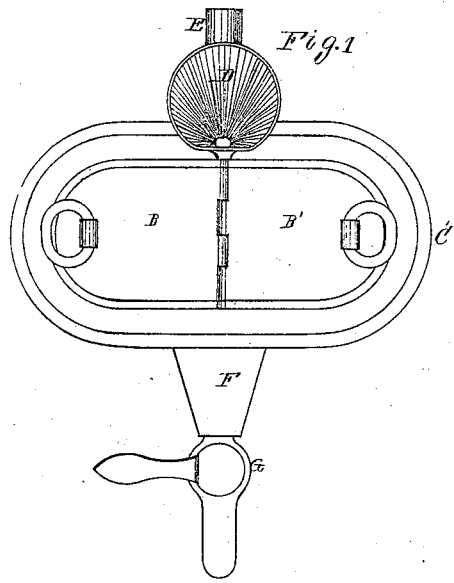
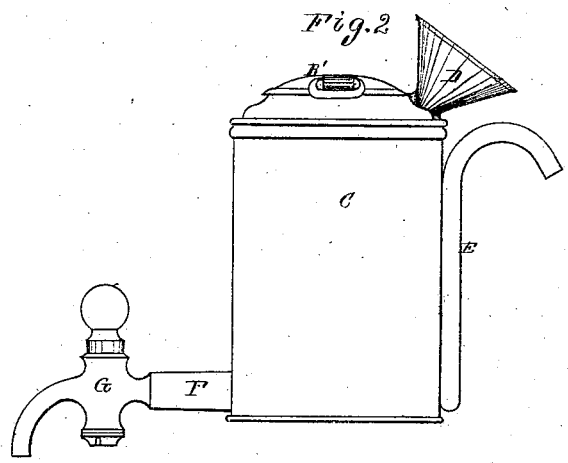
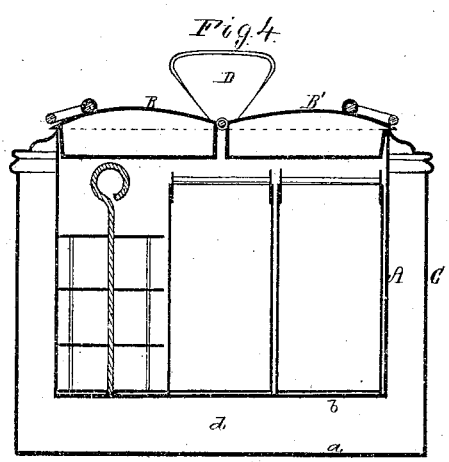
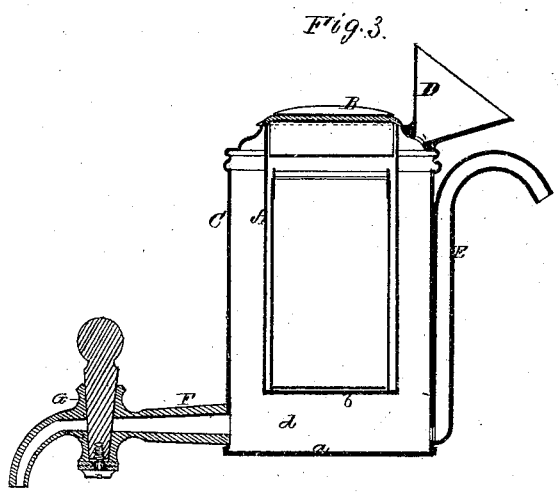
Witnesses.
S. N. Piper
L. N. Möller
John Prince and Norris D. Martin,
by their attorney.

UNITED STATES PATENT OFFICE.

JOHN PRINCE AND NORRIS D. MARTIN, OF NORTH CRAFTSBURY, VERMONT.

IMPROVEMENT IN APPARATUS FOR COOLING MILK AND CREAM.

Specification forming part of Letters Patent No. 136,542, dated March 4, 1873.

*To all whom it may concern:*

Be it known that we, JOHN PRINCE and NORRIS D. MARTIN, of North Craftsbury, of the county of Orleans and State of Vermont, have invented a new and useful Apparatus for the Preservation of Cream or various animal or vegetable matters liable to fermentation or decomposition during warm weather; and we do hereby declare the same to be fully described in the following specification and represented in the accompanying drawing, of which—

Figure 1 is a top view, Fig. 2 an end elevation, Fig. 3 a central and transverse section, and Fig. 4 a longitudinal section.

In such drawing, A denotes an elongated chamber or vessel, open at top, and there provided with two chambered covers, B B', which are pivoted or hinged to the vessel at its middle. The said vessel is arranged within and surrounded on its sides by another water-tight chamber or vessel, C, between whose bottom $a$ and the bottom $b$ of the vessel A is a space, $d$, which also extends around the sides and ends of the inner vessel, and is closed at top, all being as shown. A tunnel, D, fixed upon the said top, opens into the space $d$. Furthermore, a discharge-pipe, E, arranged outside of the vessel C, leads out of the lower part of the space $d$ up or nearly up to the top of such space, and thence is bent over in manner as shown. An educt, F, provided with a faucet, G, also leads out of the lower part of the space $d$, in manner as shown.

In order to use this apparatus it should be arranged beneath a cock or pipe for discharging a stream of cool water, the same being so that the said water may flow into the tunnel and fill the space $d$, and wash out the pipe E, which, by its arrangement, operates to preserve the space $d$, filled with water. In case it may be desirable to extract water from such space it may be done by means of the faucet.

Deep pans or vessels H, for holding cream, may be put within the vessel A, in order to preserve the cream at a cool temperature, and prevent it from souring.

While the apparatus may be in use it is intended to have a stream of cool water constantly flowing into and out of the space $d$.

We claim—

The apparatus as described, consisting of the vessel A, the tight water-space $d$, (encompassing and extending underneath such,) the chambered covers B B', the tunnel D, the discharge-pipe E, and the educt F, and faucet G, arranged and combined in manner and to operate as and for the purpose as specified.

JOHN PRINCE.
NORRIS D. MARTIN.

Witnesses:
E. N. RANDALL,
WILLIAM HODGDON.